United States Patent Office 2,821,557
Patented Jan. 28, 1958

---

2,821,557

PROCESS OF PREPARING DIBROMO-DI-PERI-NAPHTHINDANDION

Albert Bloom, Summit, and Dennis L. Deutsch, Cranford, N. J., assignors to General Aniline & Film Corporation, New York, N. Y., a corporation of Delaware No Drawing. Application May 13, 1955
Serial No. 508,317

3 Claims. (Cl. 260—590)

The present invention relates to an improved process of preparing dibromo-di-peri-naphthindandion which is useful as an intermediate in the preparation of naphthalene-1,4,5,8-tetracarboxylic acid.

Naphthalene-1,4,5,8-tetracarboxylic acid is an important intermediate in the manufacture of dyestuffs and pigments. Several processes have been proposed for its manufacture such as (a) the formation of a 4,5 bridge on acenaphthene and subsequent oxidation and (b) from pyrene either by direct or indirect oxidative methods. In U. S. P. 2,009,596 there is disclosed a process where polyhalogenated pyrenes are reacted with concentrated or fuming sulfuric acid to result in the replacement of the halogen by hydrolysis and a simultaneous dehydrogenation to give the indicated di-peri-naphthindandion. If tetrabromopyrene is put through this sequence of reactions the end product is a dibromo derivative of the di-peri-naphthindandion. This bromination is caused by the oxidation of the formed HBr to bromine by means of the sulfuric acid. The conversion of the polyhalogenated pyrene to the di-peri-naphthindandion is a multi step reaction, the first step being the formation of a polyhalogenated pyrene quinone. These pyrene quinones are further hydrolyzed by treatment with concentrated sulfuric acid at temperatures in the range of 160–200° C. Alternately, the polyhalogenated pyrene quinone can be directly oxidized by such agents as manganese dioxide or nitric acid in sulfuric acid solutions to give the desired tetracarboxylic acid. The above mentioned di-peri-naphthindandion can also be oxidized in alkaline solution by such agents as sodium hypochlorite to the desired tetracarboxylic acid.

In actual commercial application of the foregoing process it has been found that the highest yield of naphthalene-1,4,5,8-tetracarboxylic acid can be obtained from pyrene by the following sequence of reactions necessitating the isolation of dibromo-di-peri-naphthindandion. In carrying out this sequence of reactions by the process described in U. S. P. 2,009,596 the step comprising the high temperature hydrolysis of this intermediate has been the cause of great difficulty due to the exeremely corrosive nature of the following reaction:

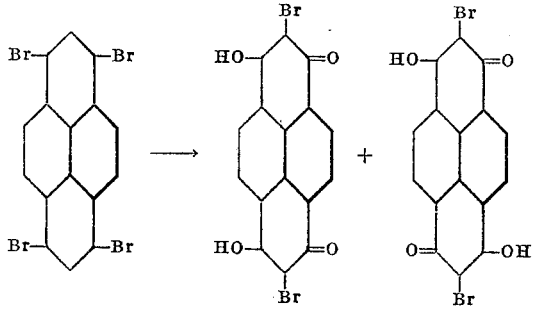

In all of the operational steps described in the aforementioned patent, use must be made of either concentrated sulfuric acid or fuming sulfuric acid. According to the teachings in said patent, the best results are obtained when the hydrolysis is conducted in 100% sulfuric acid at a temperature ranging between 165–170° C. By employing oleum, such as for example 20% oleum, the reaction will take place at 115–120° C. but the yield is reduced by about 15%.

In checking the various examples given in U. S. P. 2,009,596 we found that best results are obtained when the hydrolysis is conducted in 100% sulfuric acid at 165–170° C. In an attempt to avoid the above mentioned corrosive conditions we lowered the temperature of this reaction and increased the time. These changes resulted in a 10% lower yield. Experiments were also made using various strengths of oleums to determine whether the reaction temperature could be lowered and the corrosive nature of the reaction mixture improved. It was found that by using 20% oleum, the reaction took place at 115–120° C. but the yield was reduced by about 15%. 10% and 5% oleum also allowed the reaction temperature to be lowered somewhat, however, in these cases there was also a loss of yield.

It was, therefore, quite surprising and unexpected when we found that the use of oleum of below 20% strength, preferably 1–4% oleum allows the reaction to be conducted at 150° C. and gives a very high yield of the dibromo-di-peri-naphthindandion.

It is an object of the present invention to provide an improved process of preparing dibromo-di-peri-naphthindandion while avoiding the shortcomings of the aforementioned process and increasing the yield to about 97% of theory.

Other objects and advantages will become apparent from the following description:

We have found that 3,5,8,10-tetrabromopyrene is readily hydrolyzed in 1–4% oleum at a temperature of 145–160° C. to give dibromo-di-peri-naphthindandion with a yield of 97% of theory. The behavior of 1–4% oleum in the hydrolysis reaction simulates that of 100% sulfuric acid without the undesired side reactions such as the oxidation and sulfonation encountered when using oleum of higher concentrations. Moreover, the corrosive nature of the reaction where 1–4% oleum is employed is substantially lower than when 100% sulfuric acid is used.

The following examples will serve to illustrate how the improved process of the present invention is carried out. The amount of oleum used is not limited to that shown in the examples.

Example I 200 parts of 3,5,8,10-tetrabromopyrene (obtained by the bromination of pyrene in nitrobenzene at 120° C., kept at 120° C. until no more HBr escaped, then steam distilled in order to remove the solvent) are added in 1 hour to a mixture containing 1530 parts of 100% sulfuric acid and 270 parts of sulfuric acid containing 20% of $SO_3$ at 25–30° C. The temperature is raised to 150° C. in 2 hours and then kept at 150–155° C. for 3 hours. During the heating and while on temperature a strong gas evolution occurs ($SO_2$, $Br_2$ and HBr). The mixture is allowed to cool to 100° C. and 900 parts of water are added at 100–110° C. After holding it at this temperature for ½ hour the crystallization of the corresponding sulfate is complete and after drowning into 9000 parts of water the free dibromo-di-peri-naphthindandion is obtained. The red-brown precipitate is filtered off and washed free of acid. The yield is 97.3% of theory.

Example II

Into a mixture of 833 parts of 100% sulfuric acid and 68 parts 20% oleum, there are charged 100 parts of tetrabromopyrene (obtained by the bromination of pyrene in nitrobenzene as solvent). After the addition, the temperature is raised to 155° C. and is kept at this temperature until the gas evolution ceases. After cooling, the reaction mixture is diluted with 330 parts of water until the crystallization is complete. The whole is then cooled to room temperature and is filtered through a sintered glass funnel. The reddish-brown crystals consisting of the sulfate of dibromo-di-peri-naphthindandion are resludged into 4000 parts of water and after decomposition to the free corresponding naphthindandion, the product is filtered by suction and washed neutral with water. A total of 79.2 parts of a reddish-brown product are obtained in a yield of 97.1% of theory.

We claim:

1. The process of preparing dibromo-di-peri-naphthindandion which comprises heating 3,5,8,10-tetrabromopyrene with 1–4% oleum at a temperature of 145–160° C. and isolating the said dibromo-di-peri-naphthindandion.

2. The process of preparing dibromo-di-peri-naphthindandion which comprises heating 3,5,8,10-tetrabromopyrene with 3% oleum at a temperature of 150–155° C. and isolating the said dibromo-di-peri-naphthindandion.

3. The process of preparing dibromo-di-peri-naphthindandion which comprises heating 3,5,8,10-tetrabromopyrene with 1.5% oleum at a temperature of 155° C. and isolating the said dibromo-di-peri-naphthindandion.

References Cited in the file of this patent

UNITED STATES PATENTS 2,009,596    Vollmann et al. _____ July 30, 1935